United States Patent
Waldron

(10) Patent No.: US 11,763,438 B2
(45) Date of Patent: Sep. 19, 2023

(54) SYSTEMS, METHODS, AND COMPUTER PROGRAM PRODUCTS FOR ACCESS-RELATED SAFETY DETERMINATIONS

(71) Applicant: Honeywell International Inc., Charlotte, NC (US)

(72) Inventor: John F. Waldron, Charlotte, NC (US)

(73) Assignee: Honeywell International Inc., Charlotte, NC (US)

( * ) Notice: Subject to any disclaimer, the term of this patent is extended or adjusted under 35 U.S.C. 154(b) by 131 days.

(21) Appl. No.: 17/246,317

(22) Filed: Apr. 30, 2021

(65) Prior Publication Data

US 2022/0351357 A1   Nov. 3, 2022

(51) Int. Cl.
| | |
|---|---|
| *G06T 7/00* | (2017.01) |
| *G06T 7/70* | (2017.01) |
| *G07C 9/20* | (2020.01) |
| *G06K 7/14* | (2006.01) |
| *G08B 5/22* | (2006.01) |

(52) U.S. Cl.
CPC .......... *G06T 7/0002* (2013.01); *G06K 7/1413* (2013.01); *G06T 7/70* (2017.01); *G07C 9/20* (2020.01); *G08B 5/22* (2013.01); *G06T 2207/20081* (2013.01); *G06T 2207/30196* (2013.01); *G06T 2207/30232* (2013.01)

(58) Field of Classification Search
None
See application file for complete search history.

(56) References Cited

U.S. PATENT DOCUMENTS

| | | | | |
|---|---|---|---|---|
| 10,380,814 | B1 * | 8/2019 | Mathiesen | G07C 9/253 |
| 20,220,150 | * | 5/2022 | Lad | A62B 18/02 |
| 2008/0272903 | A1 * | 11/2008 | Plasberg | F16P 3/144 |
| | | | | 340/532 |
| 2013/0282609 | A1 * | 10/2013 | Au | G06V 10/757 |
| | | | | 705/325 |

(Continued)

FOREIGN PATENT DOCUMENTS

| | | | |
|---|---|---|---|
| WO | WO-2019224659 A1 * | 11/2019 | .............. A62B 27/00 |
| WO | 2021/224728 | 11/2021 | |

OTHER PUBLICATIONS

European Search Report and Search Opinion received for EP Application No. 22167567.1, dated Sep. 26, 2022, 11 pages.

*Primary Examiner* — Delomia L Gilliard
(74) *Attorney, Agent, or Firm* — Alston & Bird LLP

(57) ABSTRACT

Systems, methods, and computer program products for access-related safety determinations are provided. An example method includes receiving first image data of a field of view of a first imaging device that includes an access location and determining an access condition of the access location based upon the first image data. In response to an attempt to access the access location by a first user, the method includes receiving second image data of a field of view of a second imaging device that includes the first user upon which to perform a safety determination. The method further includes generating a safety parameter for the first user that is indicative of a presence and a positioning of a safety device of the first user, comparing the safety parameter with a validation threshold, and generating an alert signal in an instance in which the safety parameter fails to satisfy the validation threshold.

20 Claims, 5 Drawing Sheets

(56) References Cited

U.S. PATENT DOCUMENTS

| | | | |
|---|---|---|---|
| 2014/0307076 A1* | 10/2014 | Deutsch | F16P 3/142 |
| | | | 348/77 |
| 2018/0311517 A1* | 11/2018 | Patil | A62B 18/02 |
| 2019/0294703 A1* | 9/2019 | Bolin | G06N 3/08 |
| 2019/0318170 A1* | 10/2019 | Rokade | H04N 7/181 |
| 2020/0050836 A1* | 2/2020 | Gugino | G06T 17/00 |
| 2020/0074662 A1* | 3/2020 | Williams | G06T 7/60 |
| 2021/0142465 A1* | 5/2021 | Donoghue | G06T 7/0002 |
| 2021/0216773 A1* | 7/2021 | Bohannon | G06V 20/20 |
| 2022/0262066 A1* | 8/2022 | Hladik | G06V 20/52 |

* cited by examiner

SYSTEMS, METHODS, AND COMPUTER PROGRAM PRODUCTS FOR ACCESS-RELATED SAFETY DETERMINATIONS

TECHNOLOGICAL FIELD

Example embodiments of the present disclosure relate generally to access control systems and, more particularly, to the regulation of access control to ensure proper safety validation.

BACKGROUND

In many environments, such as manufacturing facilities, warehouses, and/or the like, workers (e.g., employees, contractors, staff, etc.) may be subject to various harmful conditions as part of performing their associated duties in these environments. Without the proper use of safety devices (e.g., personal protective equipment (PPE)) and compliance with associated safety protocols, these conditions may result in injury to the workers. Furthermore, workers in some environments, such as hospitals or medical facilities, may be subject to an increased risk of exposure to bacteria, viruses, or infectious diseases. In order to prevent or reduce this risk, the use of PPE may be recommended or required, such as by applicable industry standards, governmental regulations, or the like. The inventors have identified numerous deficiencies with the existing technologies in this field, the remedies for which are the subject of the embodiments described herein.

BRIEF SUMMARY

As described above, many industries and environments are associated with various conditions that may be harmful to employees, contractors, staff, etc. that work in these environments. By way of example, some industrial environments may, as part of normal operation, produce sound that is damaging to a worker's ears and/or produce dust, suspended particulates, caustic chemicals, flying objects, and/or the like that are potentially damaging to a worker's eyes or respiratory system if inhaled or ingested. As such, many industry regulations require that workers use safety devices such as ear plugs, safety glasses/goggles, masks, or other PPE so as to reduce or eliminate the likelihood of this damage. Furthermore, the growing risk of transmission of infection diseases, bacteria, viruses, and/or the like has resulted in various governmental regulations regarding the wearing of PPE, such as masks, to prevent or reduce the risk associated with these diseases.

Traditional systems that attempt to determine proper safety device or PPE usage may rely upon on various example image processing techniques. For example, such systems may analyze a plurality of two-dimensional (2D) images to determine if a particular user is wearing a particular item of PPE. These image processing techniques, however, are often computationally intensive and require increased processing resources and/or an increased processing time in order for a safety device or PPE determination to occur. As such, these conventional systems are inapplicable to various implementations where real-time or substantially real-time determinations are required. By way of example, building entrances, turnstiles, hallways, checkpoints, gates, and/or other access locations are often subjected to large numbers of users (e.g., high traffic environments) attempting to enter or exit a particular location. Due to the volume of image processing computations or determinations associated with these high traffic environments, many traditional systems may fail to timely perform a safety device or PPE validation determination resulting in permitting access to some users that fail to include or properly position one or more safety devices associated with the particular location. Furthermore, in some low traffic environments, these conventional systems may waste computation resources by performing image processing of images that fail to include a user requesting access (e.g., images in which a user is not present, or images in which a present user is not attempting to access a particular location).

To solve these issues and others, example implementations of embodiments of the present disclosure may leverage multiple imaging devices and machine learning techniques (e.g., artificial neural networks, convolutional neural networks, or the like) to, in near real-time, provide safety compliance determinations that are responsive to access requests. In operation, embodiments of the present disclosure may generate image data associated with a first imaging device that captures an access location, for example, a barcode located on or proximate an access door. In an instance in which the access condition is indicative of an attempt to access the access location by a user, second image data from a second imaging device may be used to determine a safety parameter indicative of a presence and a positioning of a safety device of this user. Comparisons between the safety parameter and associated validation thresholds may be used to quickly and reliable determine the presence and positioning of the safety device. Furthermore, the use of multiple imaging devices may operate to gate or buffer any required image processing determinations thereby reducing the burden experienced by these computational resources.

Apparatuses, methods, systems, devices, and associated computer program products are provided for access-related safety determinations. An example method may include receiving first image data of a field of view of a first imaging device that includes an access location and determining an access condition of the access location based upon the first image data. In an instance in which the access condition is indicative of an attempt to access the access location by a first user, the method may include receiving second image data of a field of view of a second imaging device that includes the first user upon which to perform a safety determination. The method may further include generating a safety parameter associated with the first user within the field of view of the second imaging device that is indicative of a presence and a positioning of a safety device of the first user. The method may further include comparing the safety parameter with a validation threshold and generating an alert signal in an instance in which the safety parameter fails to satisfy the validation threshold.

In some embodiments, generating the alert signal may further include generating a notification for display that comprises the safety parameter.

In some embodiments, generating the alert signal may further include preventing access for the first user to the access location.

In some embodiments, generating the alert signal may further include altering the access condition of the access location.

In some embodiments, determining the access condition of the access location may further include identifying an instance of scannable indicia in the first image data and determining an open state access condition for the access location based upon the scannable indicia.

In other embodiments, determining the access condition of the access location may further include identifying an absence of scannable indicia in the first image data and determining an open state access condition for the access location based upon the absence of scannable indicia.

In some embodiments, generating the safety parameter may further include comparing the second image data that includes the first user with calibrated image data associated with the first user.

In other embodiments, generating the safety parameter may further include supplying the second image data to a machine learning model.

The above summary is provided merely for purposes of summarizing some example embodiments to provide a basic understanding of some aspects of the disclosure. Accordingly, it will be appreciated that the above-described embodiments are merely examples and should not be construed to narrow the scope or spirit of the disclosure in any way. It will be appreciated that the scope of the disclosure encompasses many potential embodiments in addition to those here summarized, some of which will be further described below.

BRIEF DESCRIPTION OF THE DRAWINGS

Having described certain example embodiments of the present disclosure in general terms above, reference will now be made to the accompanying drawings. The components illustrated in the figures may or may not be present in certain embodiments described herein. Some embodiments may include fewer (or more) components than those shown in the figures.

DETAILED DESCRIPTION

Figure 1:
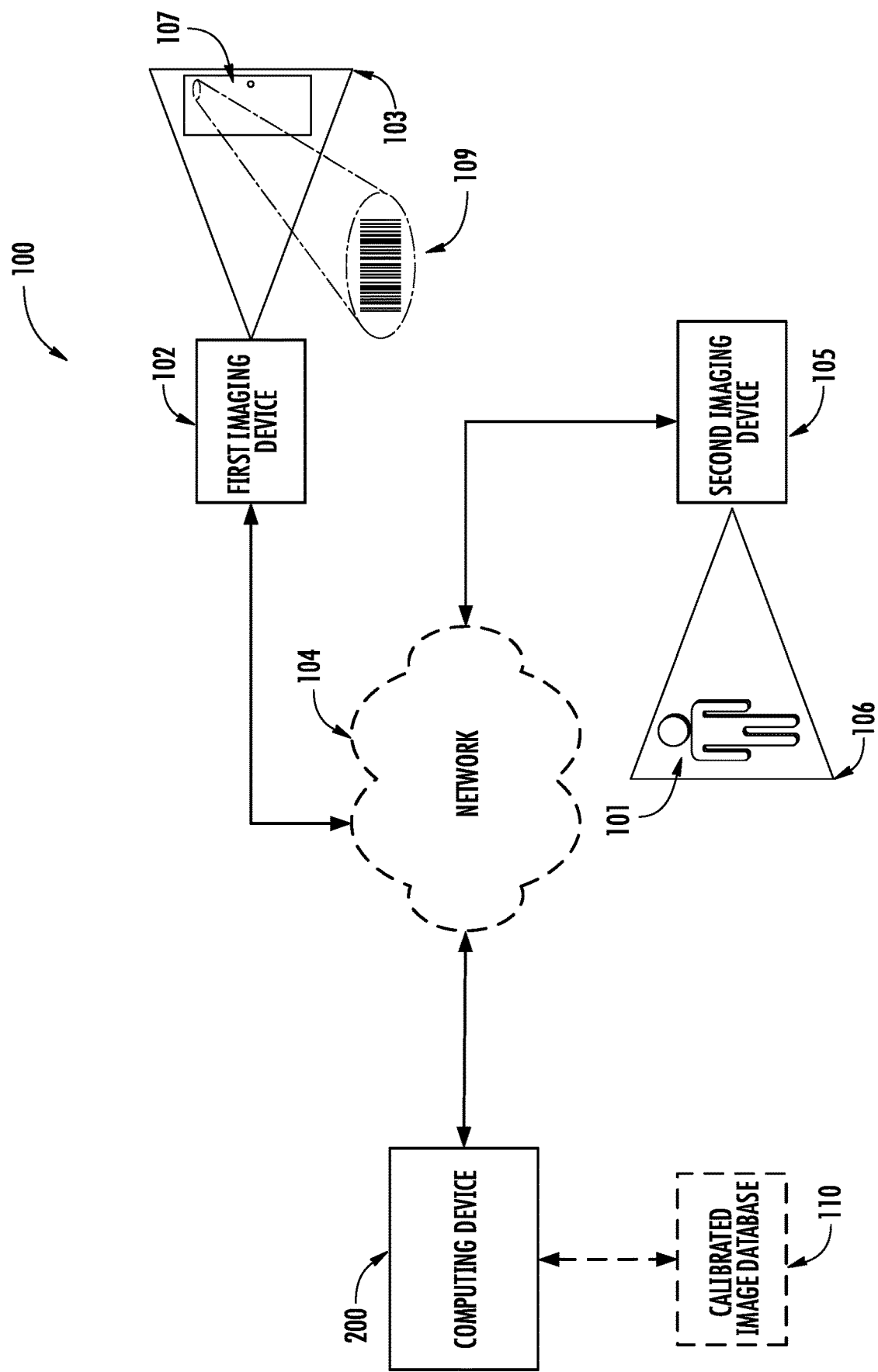
FIG. 1 illustrates an example system including imaging devices for access-related safety determinations in accordance with some example embodiments described herein.

Some embodiments of the present disclosure will now be described more fully hereinafter with reference to the accompanying drawings, in which some, but not all embodiments of the disclosure are shown. Indeed, this disclosure may be embodied in many different forms and should not be construed as limited to the embodiments set forth herein; rather, these embodiments are provided so that this disclosure will satisfy applicable legal requirements. Like numbers refer to like elements throughout. As used herein, the description may refer to a computing device of an example system as an example "apparatus." However, elements of the apparatus described herein may be equally applicable to the claimed method and computer program product. Thus, use of any such terms should not be taken to limit the spirit and scope of embodiments of the present disclosure.

Definition of Terms

As used herein, the terms "data," "content," "information," "electronic information," "signal," "command," and similar terms may be used interchangeably to refer to data capable of being transmitted, received, and/or stored in accordance with embodiments of the present disclosure. Thus, use of any such terms should not be taken to limit the spirit or scope of embodiments of the present disclosure. Further, where a first device is described herein to receive data from a second device, it will be appreciated that the data may be received directly from the second device or may be received indirectly via one or more intermediary computing devices, such as, for example, one or more servers, relays, routers, network access points, base stations, hosts, and/or the like, sometimes referred to herein as a "network." Similarly, where a first device is described herein as sending data to a second device, it will be appreciated that the data may be sent directly to the second device or may be sent indirectly via one or more intermediary computing devices, such as, for example, one or more servers, remote servers, cloud-based servers (e.g., cloud utilities), relays, routers, network access points, base stations, hosts, and/or the like.

As used herein, the term "comprising" means including but not limited to and should be interpreted in the manner it is typically used in the patent context. Use of broader terms such as comprises, includes, and having should be understood to provide support for narrower terms such as consisting of, consisting essentially of, and comprised substantially of.

As used herein, the phrases "in one embodiment," "according to one embodiment," "in some embodiments," and the like generally refer to the fact that the particular feature, structure, or characteristic following the phrase may be included in at least one embodiment of the present disclosure. Thus, the particular feature, structure, or characteristic may be included in more than one embodiment of the present disclosure such that these phrases do not necessarily refer to the same embodiment.

As used herein, the word "example" is used herein to mean "serving as an example, instance, or illustration." Any implementation described herein as "example" is not necessarily to be construed as preferred or advantageous over other implementations.

As used herein, the terms "first imaging device" or "first imager" refer to a device or devices capable of generating first image data. Example first imaging devices may include 2D cameras, three-dimensional (3D) cameras, stereo cameras, depth cameras, time-of-flight (TOF) cameras or sensors, range cameras, barcode reader or scanners, scanning devices, quick response (QR) code scanners or cameras, direct parts marking (DPM) scanners or cameras, and/or the like that may generate image data indicative of a field of view (FOV) of the first imaging device. Said differently, the first imaging device of the present disclosure may include any device configured to generate first image data that, as described hereafter, includes an access location. By way of a non-limiting example, the first imaging device may include a barcode scanner, reader, or camera (e.g., camera of a mobile device or otherwise) configured to identify scannable indicia (e.g., a barcode or the like) within a FOV of the first imaging device. Although described hereinafter with reference to an example first imaging device that generates first image data used to identify an access location and associated condition, the present disclosure contemplates that other location detection technology (e.g., RFID tags, geolocation data, proximity sensors, position sensors, etc.) may be used in place of or in addition to the first imaging device. Furthermore, although described hereafter with reference to a barcode as an example scannable indicia, the present disclosure contemplates that one or more display devices (e.g., a liquid crystal display (LCD), a display of a mobile device, etc.) may additionally or alternatively be used to present scannable indicia (e.g., a digital implementation).

As used herein, the terms "second imaging device" or "second imager" refer to a device or devices capable of generating second image data. Example second imaging devices may also include 2D cameras, 3D cameras, stereo cameras, depth cameras, TOF cameras or sensors, range cameras, barcode reader or scanners, scanning devices, QR code scanners or cameras, DPM scanners or cameras (e.g., camera of a mobile device or otherwise), and/or the like that may generate image data indicative of a FOV of the second imaging device. Said differently, the second imaging device of the present disclosure may include any device configured to generate second image data that, as described hereafter, includes a first user upon which to perform a safety determination. By way of a non-limiting example, the second imaging device may include a 2D or 3D camera configured to capture images that include a first user and any associated safety device of the first user within the FOV of the second imaging device. Although described hereinafter with reference to an example second imaging device that generates second image data that includes a first user and associated safety devices, the present disclosure contemplates that other sensors or equivalent technology (e.g., RFID tags, geolocation data, proximity sensors, position sensors, etc.) may be used in place of or in addition to the second imaging device.

As used herein, the term "computing device" refers to any user device, controller, object, or system which may be in physical or network communication with a first imaging device and/or second imaging device as described hereafter. For example, the computing device may refer to a wireless electronic device configured to perform various access condition determinations and/or safety parameter related operations in response to first image data and/or second image data generated by the first imaging device and/or the second imaging device, respectively. The computing device may be configured to communicate with the first imaging device and/or the second imaging device via Bluetooth, NFC, Wi-Fi, 3G, 4G, 5G protocols, and the like. In some instances, the computing device may comprise the first imaging device and/or the second imaging device (e.g., an integrated configuration).

As used herein, the terms "safety device" and "PPE" may be used interchangeably to refer to clothing, garments, equipment, pads, guards, shields, masks, and/or the like configured to reduce or prevent injury or infection to a user. Safety devices and PPE may further be configured to prevent or mitigate physical, chemical, and/or biological damage to a user. For example, safety device and PPE may include hearing protection (e.g., ear plugs, earmuffs, etc.), eye protection (e.g., goggles, face shields, glasses, etc.), skin protection (e.g., gloves, cut-resistant covers, hazardous resistant materials, particulate blocking articles, etc.), breathing protection (e.g., respirators, masks, etc.), among others. Said differently, the present disclosure contemplates that the safety devices and PPE described herein may refer to any device, system, or element that at least partially protects a user from potential hazards.

As used herein, the term "access location" may refer to a physical location at which a safety device or PPE validation may occur. For example, access locations may refer to building entrances, turnstiles, hallways, checkpoints, gates, thresholds, and/or other physical locations at which access may be requested by a user. Although described hereafter with reference to a door that may serve as an entrance and/or exit for a first user as an example access location, the present disclosure contemplates that any location may be an access location based upon the intended application of the access-related safety determination system. By way of a particular example, an access location may refer to an entrance checkpoint, gate system, or other threshold through which users may be directed in order to enter a particular location (e.g., to enter an office building, to board an airplane, etc.). Furthermore, an access location may be associated with an "access condition" indicative of the state of the access location and/or indicative of a user's interaction with the access location. By way of example, an access condition for an example door (e.g., access location) may indicate that the door is physically open, physically closed, partially open, open for use by some users, closed for use by some users, and/or the like. Furthermore, the access condition may indicate that a user is currently accessing the access location, previously-accessed the access location, and/or is requesting access to the access location. Although described herein with reference to example access locations that physically restrict the movement of a user (e.g., an access door or otherwise), the present disclosure contemplates that an access location may also refer to any designated location at which users may be located for PPE related validation determinations. For example, an access location may refer to a section, segment, portion, etc. of an area within which people may be directed to await PPE related analysis (e.g., a roped-off section, a taped area of a room, etc.).

As used herein, the term "computer-readable medium" refers to non-transitory storage hardware, non-transitory storage device or non-transitory computer system memory that may be accessed by a computing device, a microcomputing device, a computational system or a module of a computational system to encode thereon computer-executable instructions or software programs. A non-transitory "computer-readable medium" may be accessed by a computational system or a module of a computational system to retrieve and/or execute the computer-executable instructions or software programs encoded on the medium. Exemplary non-transitory computer-readable media may include, but are not limited to, one or more types of hardware memory, non-transitory tangible media (for example, one or more magnetic storage disks, one or more optical disks, one or more USB flash drives), computer system memory or random access memory (such as, DRAM, SRAM, EDO RAM), and the like.

Having set forth a series of definitions called-upon throughout this application, an example system architecture and example apparatus is described below for implementing example embodiments and features of the present disclosure.

Device Architecture and Example Apparatus

With reference to FIG. 1, an example safety system 100 is illustrated with a first imaging device 102 and a second imaging device 105 operably coupled with a computing device 200 via a network 104. As defined above, the first imaging device 102 may comprise a device capable of generating first image data and may include 2D cameras, 3D cameras, stereo cameras, depth cameras, TOF cameras or sensors, range cameras, barcode reader or scanners, scanning devices, QR code scanners or cameras, DPM scanners or cameras, and/or the like. The first imaging device 102 may be associated with a FOV 103. The FOV 103 may refer to the observable area within which the first imaging device 102 may capture images (e.g., generate first image data). As described hereafter, in some embodiments, the first imaging device 102 may be positioned or oriented such that an access location 107 is physically located within the FOV 103 of the first imaging device 102. Said differently, the FOV 103 of the first imaging device 102 may be such that first image data generated by the first imaging device 102 (e.g., captured images of the FOV 103) may include image data indicated of or otherwise associated with the access location 107. The present disclosure contemplates that the first imaging device 102 may be positioned at any physical location and at any orientation based upon the intended application of the system 100. Furthermore, the present disclosure contemplates that the FOV 103 may be varied based upon the operating parameters of the first imaging device 102.

As defined above, the second imaging device 105 may also comprise a device capable of generating second image data and may include 2D cameras, 3D cameras, stereo cameras, depth cameras, TOF cameras or sensors, range cameras, barcode reader or scanners, scanning devices, QR code scanners or cameras, DPM scanners or cameras, and/or the like. The second imaging device 105 may be associated with a FOV 106. The FOV 106 may refer to the observable area within which the second imaging device 105 may capture images (e.g., generate second image data). As described hereafter, in some embodiments, the second imaging device 105 may be positioned or oriented such that one or more users (e.g., a first user 101) is at least partially located within the FOV 106 of second imaging device 105. Said differently, the FOV 106 of the second imaging device 105 may be such that second image data generated by the second imaging device 105 (e.g., captured images of the FOV 106) may include image data indicated of or otherwise associated with the first user 101. The present disclosure contemplates that the second imaging device 105 may be positioned at any physical location and at any orientation based upon the intended application of the system 100. Furthermore, the present disclosure contemplates that the FOV 106 may be varied based upon the operating parameters of the second imaging device 105.

In some embodiments as described herein, the first imaging device 102 and the second imaging device 105 may be formed as an integral device or may be otherwise commonly housed. In such an embodiment, the FOV 103 and the FOV 105 may, for example, at least partially overlap. In other embodiments, the first imaging device 102 and the second imaging device 105 may be positioned within such a common housing such that the FOV 103 and the FOV 105 do not overlap. By way of a particular example, the first imaging device 102 may be oriented proximate an access location 107 (e.g., an access door), and the second imaging device 105 may be positioned in an opposing direction toward one or more users attempting to access the access location 107. In such an example, the FOV 103 and the FOV 106 may be in opposite directions (e.g., a rear facing first imaging device 102 and a forward facing second imaging device 105). In other embodiments, the first imaging device 102 and the second imaging device 105 may be separately located. In such an embodiment, the FOV 103 and the FOV 106 may be similarly adjusted based upon the positioning of the first imaging device 102 and the second imaging device 105 based upon the intended application of the system 100. In any embodiment, the present disclosure contemplates that the FOV 103 and/or the FOV 106 may be dynamically adjusted (e.g., tilted, panned, pivoted, etc.) during performance of the operations described herein.

Alternatively or additionally, the first imaging device 102 and/or the second imaging device 105 may comprise additional or alternative technologies to include Bluetooth, RFID, biometric technologies, and/or the like. Moreover, the first imaging device 102 and/or the second imaging device 105 may, in some examples, enable a proximity card system that can support HID Prox, EM4102, and AWID proximity technologies.

With continued reference to FIG. 1, the safety system 100 may include a computing device 200 that is connected with the first imaging device 102 and the second imaging device 105 over a network 104. In some instances, the first imaging device 102 may comprise the computing device 200, in whole or in part. In some instances, the second imaging device 105 may comprise the computing device 200, in whole or in part. In other instances, the first imaging device 102, the second imaging device 105, and the computing device 200 may be formed as a single, integrated device. The computing device 200 may include circuitry, networked processors, or the like configured to perform some or all of the apparatus-based (e.g., access-related safety determination-based) processes described herein, and may be any suitable processing device and/or network server. In this regard, the computing device 200 may be embodied by any of a variety of devices. For example, the computing device 200 may be configured to receive/transmit data (e.g., image data) and may include any of a variety of fixed terminals, such as a server, desktop, or kiosk, or it may comprise any of a variety of mobile terminals, such as a portable digital assistant (PDA), mobile telephone, smartphone, laptop computer, tablet computer, or in some embodiments, a peripheral device that connects to one or more fixed or mobile terminals. Example embodiments contemplated herein may have various form factors and designs but will nevertheless include at least the components illustrated in FIG. 2 and described in connection therewith. The computing device 200 may, in some embodiments, comprise several servers or computing devices performing interconnected and/or distributed functions. Despite the many arrangements contemplated herein, the computing device 200 is shown and described herein as a single computing device to avoid unnecessarily overcomplicating the disclosure.

The network 104 may include one or more wired and/or wireless communication networks including, for example, a wired or wireless local area network (LAN), personal area network (PAN), metropolitan area network (MAN), wide area network (WAN), or the like, as well as any hardware, software and/or firmware for implementing the one or more networks (e.g., network routers, switches, hubs, etc.). For example, the network 104 may include a cellular telephone, mobile broadband, long term evolution (LTE), GSM/EDGE, UMTS/HSPA, IEEE 802.11, IEEE 802.16, IEEE 802.20, Wi-Fi, dial-up, and/or WiMAX network. Furthermore, the network 104 may include a public network, such as the Internet, a private network, such as an intranet, or combinations thereof, and may utilize a variety of networking protocols now available or later developed including, but not limited to TCP/IP based networking protocols. In some embodiments, the network 104 may refer to a collection of wired connections such that the first imaging device 102, the second imaging device 105, and/or the computing device 200 may be physically connected, via one or more networking cables or the like.

In some embodiments, the system 100 may include a calibrated image database 110 that may be hosted by the computing device 200 or otherwise hosted by devices in communication with the computing device 200. The calibrated image database 110 may be stored by any suitable storage device configured to store some or all of the information described herein (e.g., memory 204 of the computing device 200 or a separate memory system separate from the computing device 200, such as one or more database systems, backend data servers, network databases, cloud storage devices, or the like provided by another device (e.g., online application or $3^{rd}$ party provider). The calibrated image database 110 may comprise data received from the computing device 200 (e.g., via a memory 204 and/or processor(s) 202) and the corresponding storage device may thus store this data. In some embodiments, the calibrated image database 100 may be configured to store image data generated one or more of the first imaging device 102 or the second imaging device 105. By way of example, the calibrated image database 110 may be configured to receive and store, as part of an initial calibration procedure, image data associated with a plurality of users. This image data (e.g., calibrated image data) may be used for comparison with image data generated by, for example, the second imaging device 105 as part of a safety parameter determination as described hereafter.

Figure 2:
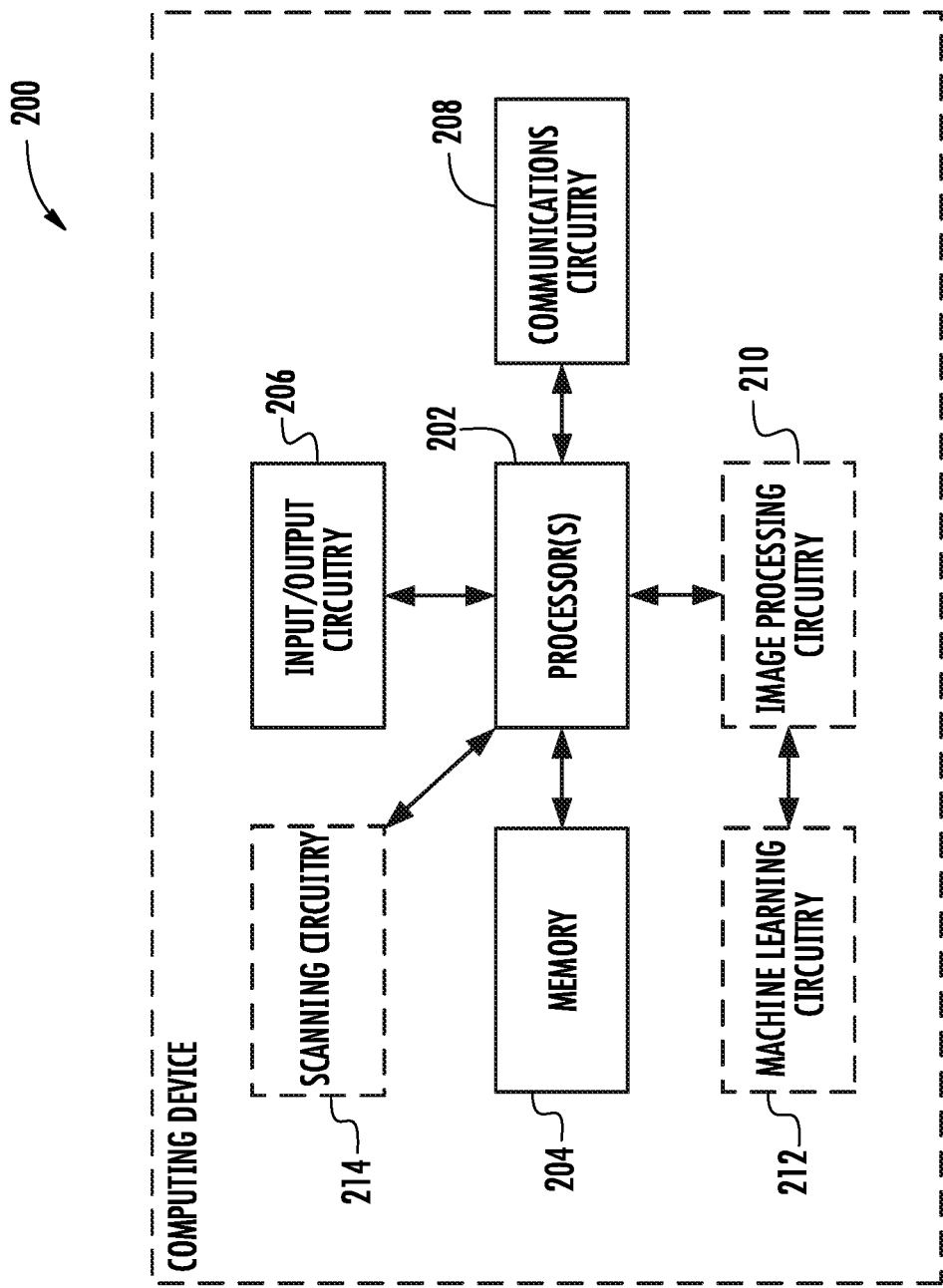
FIG. 2 illustrates a schematic block diagram of example circuitry that may perform various operations, in accordance with some example embodiments described herein.

As illustrated in FIG. 2, the computing device 200 may include a processor 202, a memory 204, input/output circuitry 206, and communications circuitry 208. Moreover, the computing device 200 may include image processing circuitry 210, machine learning circuitry 212, and/or scanning circuitry 214. The computing device 200 may be configured to execute the operations described below in connection with FIGS. 3-5. Although components 202-214 are described in some cases using functional language, it should be understood that the particular implementations necessarily include the use of particular hardware. It should also be understood that certain of these components 202-214 may include similar or common hardware. For example, two sets of circuitry may both leverage use of the same processor 202, memory 204, communications circuitry 208, or the like to perform their associated functions, such that duplicate hardware is not required for each set of circuitry. The use of the term "circuitry" as used herein includes particular hardware configured to perform the functions associated with respective circuitry described herein. As described in the example above, in some embodiments, various elements or components of the circuitry of the computing device 200 may be housed within the first imaging device 102 and/or the second imaging device 105. It will be understood in this regard that some of the components described in connection with the computing device 200 may be housed within one or more of the devices of FIG. 1, while other components are housed within another of these devices, or by yet another device not expressly illustrated in FIG. 1.

Of course, while the term "circuitry" should be understood broadly to include hardware, in some embodiments, the term "circuitry" may also include software for configuring the hardware. For example, although "circuitry" may include processing circuitry, storage media, network interfaces, input/output devices, and the like, other elements of the computing device 200 may provide or supplement the functionality of particular circuitry.

In some embodiments, the processor 202 (and/or co-processor or any other processing circuitry assisting or otherwise associated with the processor) may be in communication with the memory 204 via a bus for passing information among components of the computing device 200. The memory 204 may be non-transitory and may include, for example, one or more volatile and/or non-volatile memories. In other words, for example, the memory may be an electronic storage device (e.g., a non-transitory computer readable storage medium). The memory 204 may be configured to store information, data, content, applications, instructions, or the like, for enabling the computing device 200 to carry out various functions in accordance with example embodiments of the present disclosure.

The processor 202 may be embodied in a number of different ways and may, for example, include one or more processing devices configured to perform independently. Additionally or alternatively, the processor may include one or more processors configured in tandem via a bus to enable independent execution of instructions, pipelining, and/or multithreading. The use of the term "processing circuitry" may be understood to include a single core processor, a multi-core processor, multiple processors internal to the computing device, and/or remote or "cloud" processors.

In an example embodiment, the processor 202 may be configured to execute instructions stored in the memory 204 or otherwise accessible to the processor 202. Alternatively or additionally, the processor 202 may be configured to execute hard-coded functionality. As such, whether configured by hardware or by a combination of hardware with software, the processor 202 may represent an entity (e.g., physically embodied in circuitry) capable of performing operations according to an embodiment of the present disclosure while configured accordingly. Alternatively, as another example, when the processor 202 is embodied as an executor of software instructions, the instructions may specifically configure the processor 202 to perform the algorithms and/or operations described herein when the instructions are executed.

The computing device 200 further includes input/output circuitry 206 that may, in turn, be in communication with processor 202 to provide output to a user and to receive input from a user, user device, or another source. In this regard, the input/output circuitry 206 may comprise a display that may be manipulated by a mobile application. In some embodiments, the input/output circuitry 206 may also include additional functionality including a keyboard, a mouse, a joystick, a touch screen, touch areas, soft keys, a microphone, a speaker, or other input/output mechanisms. The processor 202 and/or user interface circuitry comprising the processor 202 may be configured to control one or more functions of a display through computer program instructions (e.g., software and/or firmware) stored on a memory accessible to the processor (e.g., memory 204, and/or the like).

The communications circuitry 208 may be any means such as a device or circuitry embodied in either hardware or a combination of hardware and software that is configured to receive and/or transmit data from/to a network and/or any other device, circuitry, or module in communication with the computing device 200. In this regard, the communications circuitry 208 may include, for example, a network interface for enabling communications with a wired or wireless communication network. For example, the communications circuitry 208 may include one or more network interface cards, antennae, buses, switches, routers, modems, and supporting hardware and/or software, or any other device suitable for enabling communications via a network. Additionally or alternatively, the communication interface may include the circuitry for interacting with the antenna(s) to cause transmission of signals via the antenna(s) or to handle receipt of signals received via the antenna(s). These signals may be transmitted by the computing device 200 using any of a number of wireless personal area network (PAN) technologies, such as Bluetooth® v1.0 through v3.0, Bluetooth Low Energy (BLE), infrared wireless (e.g., IrDA), ultra-wideband (UWB), induction wireless transmission, or the like. In addition, it should be understood that these signals may be transmitted using Wi-Fi, Near Field Communications (NFC), Worldwide Interoperability for Microwave Access (WiMAX) or other proximity-based communications protocols.

Image processing circuitry 210 includes hardware components designed to generate a safety parameter associated with a first user 101 within the FOV 106 of the second imaging device 105 based upon the second image data. The safety parameter generated by the image processing circuitry 210 may be indicative of a presence and a positioning of a safety device of the first user 101. Image processing circuitry 210 may utilize processing circuitry, such as the processor 202, to perform its corresponding operations, and may utilize memory 204 to store collected information. In some instances, the image processing circuitry 210 may further include machine learning circuitry 212 that includes hardware components designed to leverage artificial intelligence to generate the safety parameter. By way of example, machine learning circuitry 212 may comprise or leverage an artificial neural network or convolutional neural network trained on at least image data of a plurality of users. The machine learning circuitry 212 may also utilize processing circuitry, such as the processor 202, to perform its corresponding operations, and may utilize memory 204 to store collected information.

Scanning circuitry 214 includes hardware components designed to, in some embodiments, determine the access condition of the access location 107. By way of example, in some instances, the access location 107 may include scannable indicia 109 (e.g., a barcode or otherwise) that may be captured by the first imaging device 102. The scanning circuitry 214 may be configured to identify this scannable indicia 109 and determine the access condition of the access location 107. Scanning circuitry 214 may utilize processing circuitry, such as the processor 202, to perform its corresponding operations, and may utilize memory 204 to store collected information.

It should also be appreciated that, in some embodiments, the image processing circuitry 210, the machine learning circuitry 212, and/or the scanning circuitry 214 may include a separate processor, specially configured field programmable gate array (FPGA), or application specific interface circuit (ASIC) to perform its corresponding functions.

In addition, computer program instructions and/or other type of code may be loaded onto a computer, processor or other programmable circuitry to produce a machine, such that the computer, processor other programmable circuitry that execute the code on the machine create the means for implementing the various functions, including those described in connection with the components of computing device 200.

As described above and as will be appreciated based on this disclosure, embodiments of the present disclosure may be configured as apparatuses, systems, methods, and the like. Accordingly, embodiments may comprise various means including entirely of hardware or any combination of software with hardware. Furthermore, embodiments may take the form of a computer program product comprising instructions stored on at least one non-transitory computer-readable storage medium (e.g., computer software stored on a hardware device). Any suitable computer-readable storage medium may be utilized including non-transitory hard disks, CD-ROMs, flash memory, optical storage devices, or magnetic storage devices.

Example Operations for Access-Related Safety Determinations

Figure 3:
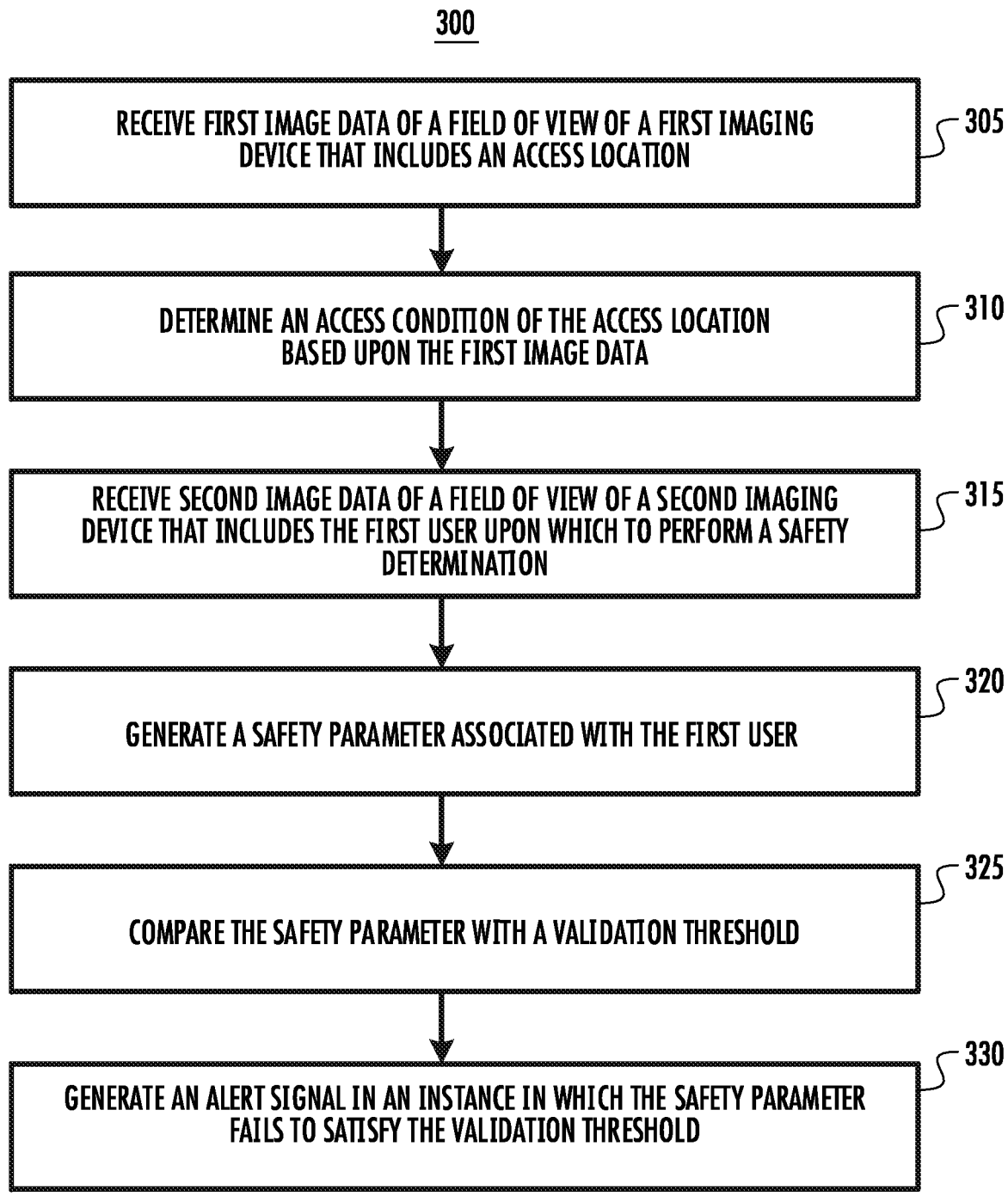
FIG. 3 illustrates an example flowchart for access-related safety determinations, in accordance with some example embodiments described herein.

FIG. 3 illustrates a flowchart containing a series of operations for access-related safety determinations. The operations illustrated in FIG. 3 may, for example, be performed by, with the assistance of, and/or under the control of an apparatus (e.g., computing device 200), as described above. In this regard, performance of the operations may invoke one or more of processor 202, memory 204, input/output circuitry 206, communications circuitry 208, image processing circuitry 210, machine learning circuitry 212, and/or scanning circuitry 214.

As described hereafter, the operations of FIG. 3 may be used to determine (1) if an access location 107 is currently open or closed and (2) if a first user 101 attempting to access such an access location 107 is properly wearing one or more items of PPE. By way of example, a camera (e.g., first imaging device 102) may capture images (e.g., first image data) associated with a FOV 103 of the camera (e.g., first imaging device 102). This FOV 103 may include an access location 107 as defined above and may further include a barcode or other scannable indicia 109. The system may determine the current status or position (e.g., access condition) of the access location 107 by analyzing the images of the camera (e.g., first imaging device 102). In response to this determination, another camera (e.g., second imaging device 105) may capture images (e.g., second image data) associate with a FOV 106 of this camera (e.g., second imaging device 105). The FOV 106 may include one or more users (e.g., at least a first user 101) that may attempt to access the access location 107. As described hereafter, the FOV 103 and the FOV 106 may, in some instances, at least partially overlap.

The system may analyze the images (e.g., second image data) of this camera (e.g., the second imaging device 105) to determine the presence and positioning (e.g., a safety parameter) of any items of PPE used by the one or more users (e.g., at least the first user 101). The presence and positioning of the PPE may be compared against known or otherwise valid PPE usage to determine if the PPE is properly worn (e.g., compared with a validation threshold). An alert signal that prevents access to the subject user(s) is generated when PPE is missing or improperly worn. An alert signal that provides access to the subject user(s) is generated when PPE is present and properly worn.

As shown in operation 305, the apparatus (e.g., computing device 200) includes means, such as processor 202, communications circuitry 208, image processing circuitry 210, or the like, for receiving first image data of the FOV 103 of the first imaging device 102 that includes an access location 107. As described above, the first imaging device 102 may be configured to capture the FOV 103 of the first imaging device 102 as first image data that is a 2D or 3D representation of this FOV 103. By way of example, the first imaging device 102 may be positioned and/or oriented proximate an access location 107 such that the access location 107 is within the FOV 103.

The first image data generated by the first imaging device 102 may include numerical values representative of the coordinates of the vertices forming polygons within the field of view of the first imaging device 102. For example, first image data may, in some embodiments, include 3D image data associated with the relative position of a particular vertex (e.g., x and y coordinates) within the FOV 103 and may also include numerical values of coordinates associated with the relative distance (e.g., depth or z coordinate)

between the first imaging device 102 and the subject (e.g., the objects within the FOV 103). By way of a particular example, the first image data may be stored in a polygon file format (PLY) that describes an object as a collection of vertices, faces, and the like along with various properties (e.g., color, normal direction, etc.) attached to these elements. The 3D image data, stored as a PLY file or otherwise, may contain the description of hand-digitized objects, polygon objects from modeling programs, range data, triangles from marching cubes (e.g., iso-surfaces from volume data), terrain data, radiosity models, and/or the like. Additionally, example properties that might be generated as 3D image data and stored with an example object as a PLY file may include color, surface normals, texture coordinates, transparency, range data confidence, and/or other properties for the front and/or the back of a polygon.

Although described with reference to 3D image data, the present disclosure contemplates that the first image data generated by the first imaging device 102 may include any property or parameter based upon the nature of the first imaging device 102. By way of example, in some embodiments, the first imaging device 102 may include a barcode scanner, camera (e.g., a camera of a mobile device or otherwise) configured to scan barcodes, or any other device capable of use with scannable indicia 109. As described hereafter with reference to the operations of FIG. 4, the first imaging device 102 may be, in some embodiments, configured to generate first image data that captures scannable indicia 109 located within the FOV 103 of the first imaging device 102. In such an embodiment, the first image data generated by the first imaging device 102 may identify the presence or absence of such scannable indicia 109 and, in conjunction with the computing device 200, determine an access condition based upon the presence or absence of this scannable indicia 109. In some embodiments, the scannable indicia 109 may be presented via, for example, a display device (e.g., LCD, display of mobile device, among others).

In embodiments in which the computing device 200 and the first imaging device 102 are contained with a common device or integrated device (e.g., the computing device 200 comprises the first imaging device 102), the first image data may be received by the computing device 200 as part of normal operation of the first imaging device 102 (e.g., an internal transmission, if any). In other embodiments in which the computing device 200 is located separate from the first imaging device 102, such as connected via network 104, the computing device 200 may be configured to receive the first image data from the first imaging device 102 in response to generation of the first image data. Said differently, each instance of first image data generation may be transmitted to the computing device 200 upon generation. In other embodiments, the computing device 200 may periodically (e.g., according to a defined rate) request first image data from the first imaging device 102.

In some embodiments, the first image data may be generated by the first imaging device 102 and/or transmitted to the computing device 200 in response to an interaction with the access location 107 within the FOV 103 of the first imaging device. By way of example, a first user 101 may attempt to enter a healthcare facility that employs one or more features of the safety system 100. The attempt to access such a facility (e.g., scanning of an identification badge, attempt to open an door, attempt to pass an access point, or the like) may cause the first imaging device 102 to capture one or more images (e.g., generate first image data) that includes the access location 107. As described hereafter, the generation of the first image data may be responsive to a change in the access condition of the access location 107, such as instances in which scannable indicia 109 within the FOV 103 of the first imaging device 102 becomes present or becomes absent. Said differently, the first imaging device 102 may be configured to generate first image data in an instance in which scannable indicia 109 is present within the FOV 103. Furthermore, in some embodiments, the first imaging device may continuously generate first image data, and, in response to an access attempt by the first user 101 or otherwise, the computing device 200 may transmit a request to the first imaging device 102 for first image data that includes the access location 107.

As shown in operation 310, the apparatus (e.g., computing device 200) includes means, such as processor 202, image processing circuitry 210, machine learning circuitry 212, scanning circuitry 214, or the like, for determining an access condition of the access location 107 based upon the first image data. As defined above, the access location 107 may be associated with an access condition indicative of the state of the access location 107 and/or indicative of a user's interaction with the access location 107. By way of example, an access condition for an example door (e.g., access location 107) may indicate that the door is physically open, physically closed, partially open, open for use by some users, closed for use by some users, and/or the like. Furthermore, the access condition may indicate that a user is currently accessing the access location 107, previously-accessed the access location 107, and/or is requesting access to the access location 107.

As described with reference to operation 305, the first image data may include 2D or 3D image data that includes a plurality of pixels, coordinates of vertices, faces, and the like along with various properties (e.g., color, normal direction, etc.) attached to these elements. In such an embodiment, the computing device 200 may, via the image processing circuitry 210 and/or machine learning circuitry 212, perform image processing on the first image data to determine the physical position or orientation of the access location 107. By way of continued example, the access location 107 may, in some embodiments, refer to an access door through which users may enter and/or exit a healthcare facility. As such, the access condition for such an access location 107 (e.g., an access door) may refer to a determination of if the access door is open at operation 310. In such an embodiment, the computing device 200 may analyze a plurality of first image data entries and, for example, compare the first image data with image data that includes the access location 107 in an open position (e.g., generated as part of an initial setup, training procedure, or otherwise).

In some embodiments, the access condition may be determined based upon a user's interaction with the access location 107. By way of example, the first image data generated by the first imaging device 102 (or by the second imaging device 105 described hereafter) may also capture a first user 101 proximate the access location 107. By way of a particular example, the first imaging device 102 may capture images (e.g., generate first image data) that includes a plurality of users queued to enter a healthcare facility via an access door (e.g., access location 107) of said healthcare facility. Similar to the image processing techniques described above with reference to comparisons between image data, the computing device 200, via the image processing circuitry 210 and/or the machine learning circuitry 212, may determine the access condition for the access location 107 based upon the attempt to access the access location 107 by one or more users.

As described above, in some embodiments, the first imaging device 102 may include a barcode scanner, camera configured to scan barcodes, or any other device capable of use with scannable indicia 109. As described hereafter with reference to the operations of FIG. 4, the first imaging device 102 may be configured to generate first image data that captures scannable indicia 109 located within the FOV 103 of the first imaging device 102. In such an embodiment, the first image data generated by the first imaging device 102 may identify the presence or absence of such scannable indicia 109 and, in conjunction with the computing device 200, determine an access condition based upon the presence or absence of this scannable indicia 109. For example, the first imaging device 102 may include a barcode scanner or camera configured to continuously generate first image data that includes scannable indicia 109 associated with an access door (e.g., an access location 107). This scannable indicia 109 may, in some embodiments, be positioned such that the presence of the scannable indicia 109 indicates that the access door is open (e.g., a barcode only viewable in instances in which the access door is open). This scannable indicia 109 may, in other embodiments, be positioned such that the absence of the scannable indicia 109 indicates that the access door is open (e.g., a barcode that is only complete or viewable in instances in which the access door is closed). In such an embodiment, the determination of the access condition at operation 310 may be an easily-processed determination in which the presence or absence of scannable indicia 109 may be ascertained by the computing device 200 without significate processing resources. As described above, although illustrated herein with reference to scannable indicia 109 physically associated with the access location 107, the present disclosure contemplates that the scannable indicia 109 may additionally or alternatively refer to a digital representation of the scannable indicia 109. Said differently, the performance of operations 305 and 310 may not burden the computational resources of the computing device 200 and, as such, may operate to gate or buffer performance of the operations described hereafter.

In an instance in which the access condition is indicative of an attempt to access the access location 107 by a first user 101, as shown in operation 315, the apparatus (e.g., computing device 200) includes means, such as processor 202, communications circuitry 208, image processing circuitry 210, or the like, for receiving second image data of a field of view 106 of a second imaging device 105 that includes the first user 101 upon which to perform a safety determination. As described above, the second imaging device 105 may be configured to capture the FOV 106 of the second imaging device 105 as second image data that is a 2D or 3D representation of this FOV 106. By way of example, the second imaging device 105 may be positioned and/or oriented so as to capture users attempting to access an access location 107.

Similar to the first image data, the second image data generated by the second imaging device 105 may include numerical values representative of the coordinates of the vertices forming polygons within the field of view of the second imaging device 105. For example, second image data may, in some embodiments, include 3D image data associated with the relative position of a particular vertex (e.g., x and y coordinates) within the FOV 106 and may also include numerical values of coordinates associated with the relative distance (e.g., depth or z coordinate) between the second imaging device 105 and the subject (e.g., the objects within the FOV 106). By way of a particular example, the second image data may also be stored in a polygon file format (PLY) that describes an object as a collection of vertices, faces, and the like along with various properties (e.g., color, normal direction, etc.) attached to these elements. The 3D image data, stored as a PLY file or otherwise, may contain the description of hand-digitized objects, polygon objects from modeling programs, range data, triangles from marching cubes (e.g., iso-surfaces from volume data), terrain data, radiosity models, and/or the like. Additionally, example properties that might be generated as 3D image data and stored with an example object as a PLY file may include color, surface normals, texture coordinates, transparency, range data confidence, and/or other properties for the front and/or the back of a polygon. Although described with reference to 3D image data, the present disclosure contemplates that the second image data generated by the second imaging device may also include any property or parameter based upon the nature of the second imaging device 105.

In embodiments in which the computing device 200 and the second imaging device 105 are contained with a common device or integrated device (e.g., the computing device 200 comprises the second imaging device 105), the second image data may be received by the computing device 200 as part of normal operation of the second imaging device 105 (e.g., an internal transmission, if any). In other embodiments in which the computing device 200 is located separate from the second imaging device 105, such as connected via network 104, the computing device 200 may be configured to receive the second image data from the second imaging device 105 in response to generation of the second image data. Said differently, each instance of second image data generation may be transmitted to the computing device 200 upon generation. In other embodiments, the computing device 200 may periodically (e.g., according to a defined rate) request second image data from the second imaging device 105. In some embodiments, the second image data received at operation 315 may include image data entries associated with a device of the first user 101. Said differently, the first user 101 may be associated with a display device, mobile device, etc. that is present within the FOV 106 of the second imaging device 105 (e.g., viewable by the second imagining device 105). Such a display device may, in some embodiments, present information that, when captured by the second imaging device 105, identifies the first user 101. Said differently, the present disclosure contemplates that a digital representation of the user may be provided to the second imaging device 105 at operation 315.

As described above, the determination of an access condition at operation 310 may operate to gate or otherwise buffer the utilization of the second imaging device 105 so as to reduce the computational burden of the computing device 200. As such, the second image data of operation 415 may be generated, in some embodiments, by the second imaging device 105 and/or transmitted to the computing device 200 only in response to a determination of an attempt to access the location by the first user 101. By way of example, a first user 101 may attempt to enter a healthcare facility that employs one or more features of the safety system 100. The attempt to access such a facility (e.g., scanning of an identification badge, attempt to open an door, attempt to pass an access point, or the like) may cause the second imaging device 105 to capture one or more images (e.g., generate second image data) that includes the first user 101. Although described herein with reference to second image data that includes the first user 101 in the FOV 106, the present disclosure contemplates that the second image data may include a plurality of users, one or more of which may attempt to access the access location 107.

As shown in operation 320, the apparatus (e.g., computing device 200) includes means, such as processor 202, image processing circuitry 210, machine learning circuitry 212, or the like, for generating a safety parameter associated with the first user 101 within the field of view 106 of the second imaging device 105 that is indicative of a presence and a positioning of a safety device of the first user 101. As described above, in some embodiments, a user may be required to wear a safety device or PPE that is designed to protect the user from various hazards associated with a particular environment. For example, a user may be required to wear a mask in order to enter a medical or healthcare facility to reduce or prevent the transmission of infectious diseases, bacteria, viruses, etc. As such, the second image data generated at operation 315 that includes a first user 101 may further include second image data (e.g., a captured image) of a safety device (e.g., mask) positioned relative to the first user 101. Said differently, the second image data may include numerical values associated with the coordinates of the vertices of polygons associated with the mask (e.g., PPE). Although described hereinafter with reference to an example mask detection implementation, the present disclosure contemplates that the safety parameter generated at operation 320 may account for any safety device or PPE based upon the intended application of the system 100.

The safety parameter may be generated based upon this second image data and may be based upon the presence and associated positioning of the safety device relative to the first user 101. By way of continued example, the safety parameter may be indicative of or based upon a relative positioning of the mask relative to a user's mouth and nose. Said differently, a properly fitted or positioned mask may sufficiently cover (e.g., as compared to an associated threshold described hereafter) a user's mouth to reduce or prevent matter (e.g., bacteria, viruses, particulates, etc.) from entering the first user's mouth. A missing or poorly fitted mask may not sufficiently cover (e.g., as compared to an associated threshold described hereafter) a user's mouth. As described hereafter with reference to FIG. 5, determination of the safety parameter may include comparing second image data with calibrated image data associated with the first user 101 and/or supplying the second image data to a machine learning model (e.g., artificial neural network, convolutional neural network, or other machine learning system) in order to analyze the second image data to identify the presence and relative positioning of the safety device (e.g., mask) and output an associated confidence value (e.g., safety parameter).

Figure 5:
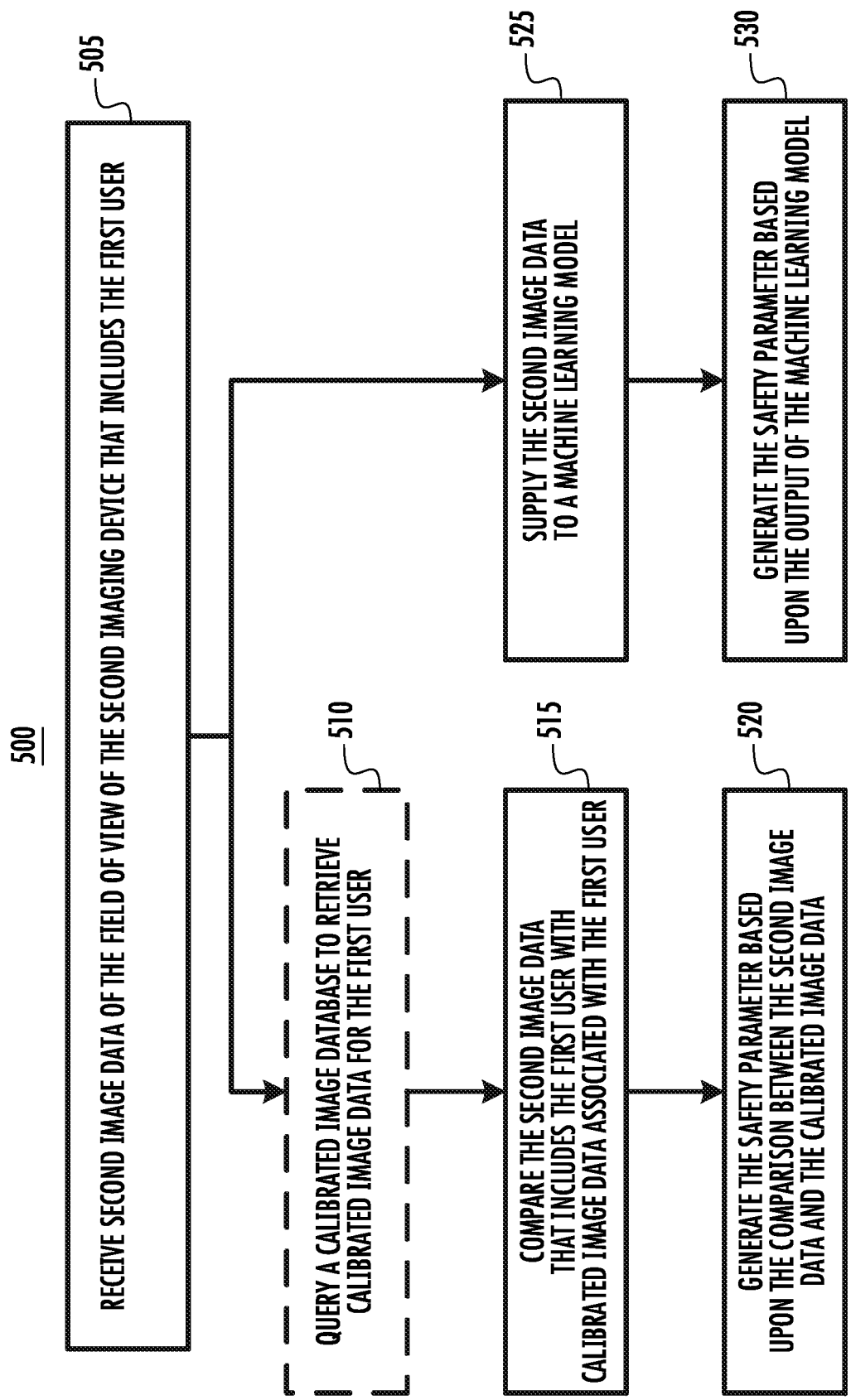
FIG. 5 illustrates an example flowchart for safety parameter generation, in accordance with some example embodiments described herein.

As described hereafter with reference to FIG. 5, the second image data may, in some embodiments, be compared with calibrated image data associated with the first user 101. In such an embodiment, the second imaging device 105, as part of an initial registration or training procedure, may capture images (e.g., generate second image data) of the first user 101 in which the first user 101 properly wears an associated safety device or PPE. This collection of captured images may be analyzed by the computing device 200, via the image processing circuitry 210 and/or the machine learning circuitry 212, to generate calibrated image data for the first user 101. The calibrated image data for the first user 101 may serve as a benchmark against which second image data generated by the second imaging device 105 that includes the first user 101 may be compared. In such an embodiment, the safety parameter generated at operation 320 may refer to a score or numerical representation of the similarity between the second image data and the calibrated image data for the first user 101. Said differently, the computing device 200 may compare the numerical values contained within the second image data indicative of the coordinates and properties of the vertices forming polygons within the FOV 106 of the second imaging device 105 including the first user 101 with the numerical values contained within the calibrated image data for the first user 101.

As described above, in some embodiments, the second image data may be supplied to a machine learning model that may, for example, be trained upon image data generated by the second imaging device for a plurality of users. For example, an artificial or convolutional neural network used by the safety system 100 may be iteratively trained upon second image data that includes a plurality of users and associated safety devices at varying positions relative to the respective users. Said differently, such an artificial or convolutional neural network may be trained upon sufficient second image data so as to ascertain the position of the first user's mouth and the presence and position of the safety device or PPE (e.g., mask) relative to the first user's mouth. By way of a particular example, the safety parameter may, in some embodiments, refer to a confidence of the computing device 200 (e.g., a confidence of the artificial neural network or convolutional neural network) that a safety device or PPE is properly positioned. For example, the system may be 60% confident that the first user's mask is properly positioned relative a user's mouth resulting in a safety parameter of 0.6 or 60%.

Thereafter, as shown in operation 325, the apparatus (e.g., computing device 200) includes means, such as processor 202, image processing circuitry 210, machine learning circuitry 212, or the like, for comparing the safety parameter with a validation threshold associated with the safety device. In order to define the presence and appropriate positioning of the safety device relative the first user 101, the computing device 200 may employ various validation thresholds associated with respective safety devices. By way of example, a mask-related device may be based upon or otherwise indicative of an associated validation threshold relating to the positioning of the safety device relative the user's mouth (e.g., a position that sufficiently shields the user's mouth). In some embodiments, each safety device may also include devices of varying sizes, shapes, type, etc. For example, masks may vary in length, shape, cross-sectional area, material, and/or the like. As such, the present disclosure contemplates that the validation thresholds and safety parameters described herein may be further configured for a safety device of a particular size, shape, type, etc. The validation thresholds described herein may, in some embodiments, be set by applicable industry standards or regulations, set by a system administrator or set up procedure, or determined based upon iterative analysis of second image data by a machine learning model.

With continued reference to operation 325, the validation threshold associated with a mask-related safety device or PPE may, for example, define a minimum confidence value of 0.85 or 85%. In such an example, the safety parameter generated at operation 320 may be compared with the validation threshold to determine if the safety parameter satisfies the validation threshold. For example, if the safety parameter generated at operation 320 that is indicative of the system's confidence that the first user's mask is present and properly covers the first user's mouth exceeds 90%, then the safety parameter satisfies the validation threshold. In such an embodiment, the safety system 100 may determine that the positioning of the safety device of the first user 101 is satisfactory to reduce or prevent the transmission of infectious diseases and may, in some embodiments as described herein, allow access for the first user 101 to the access location 107 (e.g., access to a healthcare facility or the like). Although described herein with reference to a validation threshold of 0.85 or 85%, the present disclosure contemplates that the validation threshold may define any associated confidence value or parameter based upon the intended application of the safety system 100.

In some embodiments, the comparison of the safety parameter with the validation threshold may rely upon or otherwise leverage various ratios between, for example, the parameters associated with the first user 101 (e.g., the first user's dimensions (height, width, length, etc.)). By way of example, the image processing circuitry 210 may be configured to analyze the second image data and determine the height associated with the first user 101. Additionally or alternatively, the communications circuitry 208 may be configured to query a calibrated image database 110 that includes, for example, data indicative of the height of the first user 101. In such an example embodiment, the safety parameter generated at operation 320 may refer to a position of an item of PPE as related to the height associated with the first user 101. Said differently, the safety parameter may, for example, indicate that the center of the item of PPE is located approximately 90% towards the top of the height of the first user 101.

Similarly, the validation threshold may refer to a range of percentages (e.g., between 85% and 95% of the total height of the first user 101) such that a safety parameter that falls within this range satisfies the validation threshold. By way of a particular example, the validation threshold may be defined based upon the average position of, for example, a user's eyes relative to the total height of the user such that PPP (e.g., goggles or other eyewear) that is determine to be located at such an average position of the user's eyes satisfies the validation threshold. In some embodiments, the items of PPE may include various markers (e.g., grids, axes, etc.) that may be captured by the second imaging device 105 and used to facilitate the safety parameter determination described herein. For example, the first user 101 may wear a mask that includes a grid pattern (e.g., viewable by a user, in invisible ink, or otherwise) that may be used to determine the presence of the mask as well as the associated positioning of the mask relative to the first user's face (e.g., determine if the grid aligns with the centerline of the user). Although described herein with reference to a comparison between the height of the first user 101 and the positioning of the item of PPE relative to this height, the present disclosure contemplates that any parameter, dimension, measurement, ratio, or the like associated with the first user 101 may be used based upon the intended application of the system 100.

In an instance in which the safety parameter fails to satisfy the validation threshold, as shown in operation 330, the apparatus (e.g., computing device 200) includes means, such as processor 202, communications circuitry 208, input/output circuitry 206, or the like, for generating an alert signal. The alert signal may be indicative of noncompliance of the first user 101 with regard to the presence and positioning of the safety device. In some embodiments, generating the alert signal may include generating a display that includes the safety parameter for display, for example by the input/output circuitry 206, for viewing by an operator, administrator, or other user of the safety system 100. In some embodiments, the alert signal may be transmitted, for example by the communications circuitry 208, to a user device associated with the first user 101. In such an embodiment, the alert signal may operate to notify the user of potential safety concerns associated with the absence or the positioning of the first user's safety device(s) or PPE.

In some embodiments, generating the alert signal at operation 330 may further include instructions for preventing access for the first user 101 to the access location 107. As described above, the computing device 200, first imaging device 102, and/or the second imaging device 105 may be located proximate an access location 107 so as to ensure safety validation before providing access for a particular user. By way of continued example, one or more devices of the safety system 100 may be positioned at an access door for a healthcare facility so as to confirm a proper fit for safety devices before providing access to such a facility. As such, in an instance in which the safety parameter fails to satisfy the validation threshold, the alert signal generated at operation 330 may further include instructions to one or more systems of the access location 107 (e.g., access gate, door, turnstile, or the like) that prevents access (e.g., physical access, electronic access, etc.) for the first user 101 to this access location 107. Said differently, the computing device 200 may be configured to, as described above, determine an improper or poor fit for a safety device (e.g., improper positioning of the safety device relative to the first user 101) such that the safety device fails to adequately protect the first user 101 and may prevent the first user 101 from accessing a location, system, etc. that may be harmful to the first user 101 or otherwise requires proper safety device positioning.

In some embodiments, generating the alert signal at operation 330 may further include altering the access condition of the access location 107. By way of example, the access condition determined at operation 310 may indicate that an access door (e.g., access location 107) is open (e.g., an open state condition). In an instance in which the safety parameter fails to satisfy the validation threshold, the alert signal may operate to alter this access condition by causing the access door (e.g., access location 107) to close (e.g., a closed state condition). By way of example, the computing device 200 may transmit instructions to one or more systems of the access location 107 (e.g., access gate, door, turnstile, or the like) that causes the access location 107 to prevent access (e.g., physical access, electronic access, etc.) for the first user 101 to this access location 107 when the access location 107 may have previously-allowed such access.

Figure 4:
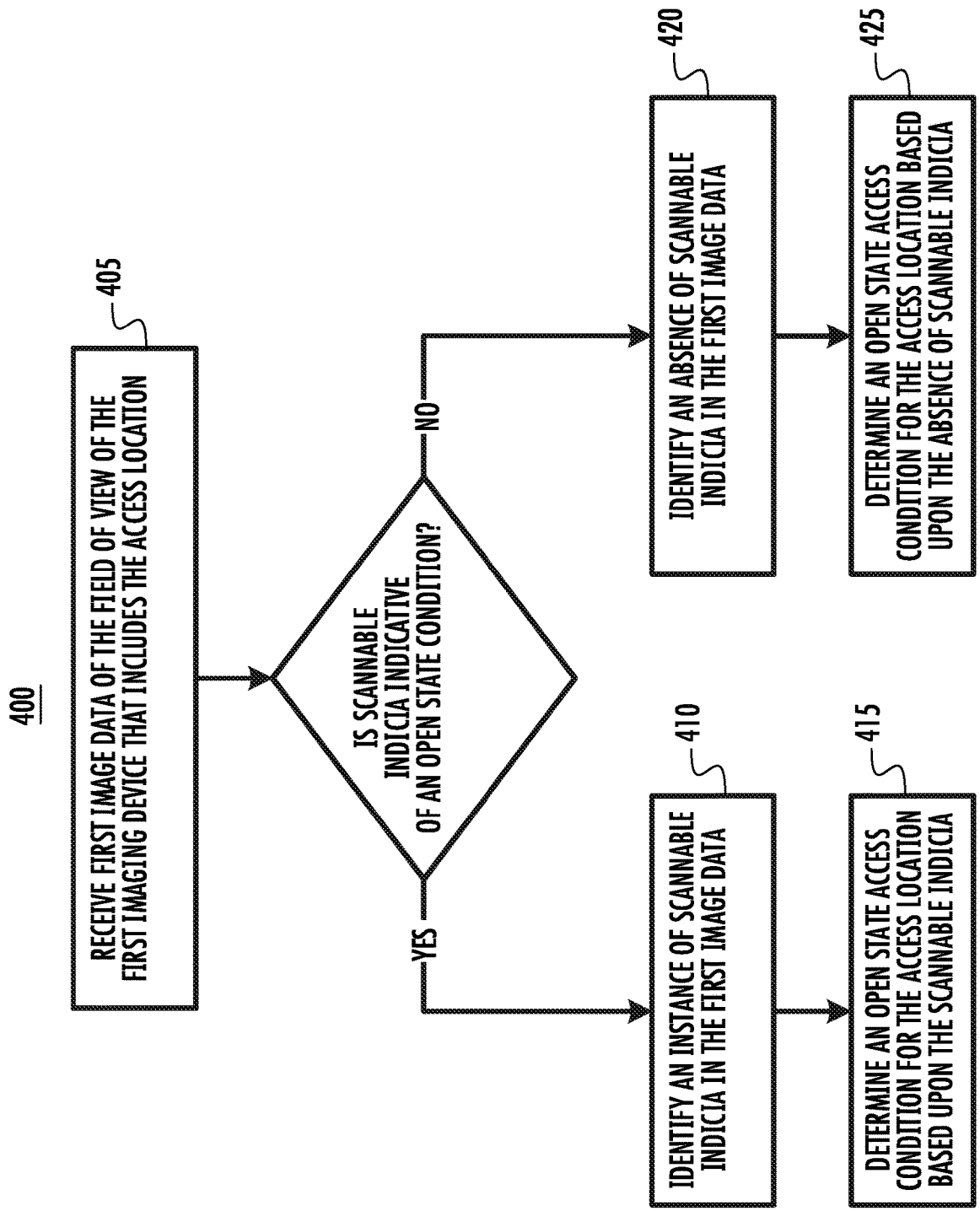
FIG. 4 illustrates an example flowchart for access condition determinations, in accordance with some example embodiments described herein.

FIG. 4 illustrates a flowchart containing a series of operations for access condition determination. The operations illustrated in FIG. 4 may, for example, be performed by, with the assistance of, and/or under the control of an apparatus (e.g., computing device 200), as described above. In this regard, performance of the operations may invoke one or more of processor 202, memory 204, input/output circuitry 206, communications circuitry 208, image processing circuitry 210, machine learning circuitry 212, and/or scanning circuitry 214. As described hereafter, the images captured (e.g., first image data) from the first imaging device 102 may be analyzed to determine the absence or presence of scannable indicia 109 (e.g., a barcode or otherwise). In some embodiments, the presence of such a barcode (e.g., scannable indicia 109) may indicate that the access location 107 is in an open state (e.g., an example access door is open). In other embodiments, the absence of such a barcode (e.g., scannable indicia 109) may indicate that the access location 107 is in an open state (e.g., the example access door is open). The present disclosure contemplates that the FOV 103 of the first imaging device 102 and/or the FOV 106 of the second imaging device 105 may be blocked by items proximate the access location 107, one or more users, and/or the like. As such, the system may be configured to generate alert signals in instances in which at least a portion of the FOVs 103, 105 are blocked, impeded, or the like. In some embodiments, such an alert signal may request that additional users be removed from the FOV 105.

As shown in operation 405, the apparatus (e.g., computing device 200) includes means, such as processor 202, communications circuitry 208, image processing circuitry 210, or the like, for receiving first image data of the FOV 103 of the first imaging device 102 that includes the access location 107. As described above with reference to operation 305, the first imaging device 102 may be configured to capture the FOV 103 of the first imaging device 102 as first image data that is a 2D or 3D representation of this FOV 103. By way of example, the first imaging device 102 may be positioned and/or oriented proximate an access location 107 such that the access location 107 is within the FOV 103. In some embodiments as shown in FIG. 4, the first imaging device 102 may include a barcode scanner, camera configured to scan barcodes, or any other device capable of use with scannable indicia 109. As such, the first imaging device 102 may be configured to generate first image data that captures scannable indicia 109 located within the FOV 103 of the first imaging device 102. As described hereafter with reference to operations 410 and 415, in some instances, the presence of scannable indicia 109 may be indicative of an open state access condition for the access location 107. As described hereafter with reference to operations 420 and 425, in some instances, the absence of scannable indicia 109 may be indicative of an open state access condition for the access location 107.

In instances in which the present of scannable indicia 109 may be indicative of an open state access condition, the apparatus (e.g., computing device 200) includes means, such as processor 202, image processing circuitry 210, scanning circuitry 214, or the like, for identifying an instance of scannable indicia 109 in the first image data as shown in operation 410. As described above, the first imaging device 102 may be configured to capture images (e.g., generate first image data) that include scannable indicia 109, such as a barcode. As such, the first imaging device 102 and/or the computing device 200 may be configured to identify an instance of scannable indicia 109 in the first image data. By way of continued example, an access door (e.g., access location 107) may include scannable indicia 109 (e.g., a barcode) that is only viewable in instances in which the access door is open. By way of a particular example, the scannable indicia 109 may be positioned on a surface such that, when the access door is closed, the access door blocks or otherwise impedes a line of sight between the first imaging device 102 and the scannable indicia 109. In some embodiments, the line of sight between the first imaging device 102 and the scannable indicia 109 may additionally or alternatively be blocked by another user (not shown) positioned proximate the access location 107 or otherwise.

In such an embodiment, as shown at operation 415, the apparatus (e.g., computing device 200) includes means, such as processor 202, communications circuitry 208, image processing circuitry 210, scanning circuitry 214, or the like, for determining an open state access condition for the access location 107 based upon the scannable indicia 109. By way of continued example, the first imaging device 102 may generate first image data that includes scannable indicia 109 at operation 405. The computing device 200, via the scanning circuitry 214, may identify this instance of scannable indicia 109 and, at operation 415, determine that the presence of such scannable indicia 109 is indicative of an open state access condition for the access location 107. Although described herein with reference to a barcode that may be blocked by an access door, the present disclosure contemplates that scannable indicia 109 of any type may be positioned at any location relative the access location 107 based upon the intended application of the system 100.

In instances in which the absence of scannable indicia 109 may be indicative of an open state access condition, the apparatus (e.g., computing device 200) includes means, such as processor 202, image processing circuitry 210, scanning circuitry 214, or the like, for identifying an absence of scannable indicia 109 in the first image data as shown in operation 420. As described above, the first imaging device 102 may be configured to capture images (e.g., generate first image data) that include scannable indicia 109, such as a barcode. As such, the first imaging device 102 and/or the computing device 200 may be configured to identify an absence of scannable indicia 109 in the first image data. By way of continued example, an access door (e.g., access location 107) may include scannable indicia 109 (e.g., a barcode) that is only viewable in instances in which the access door is closed. By way of a particular example, the scannable indicia 109 may be partially positioned on a portion of the access door and partially positioned on a surface adjacent the access door such that, when the access door is closed, the scannable indicia 109 is readable by the first imaging device 102.

In such an embodiment, as shown at operation 425, the apparatus (e.g., computing device 200) includes means, such as processor 202, communications circuitry 208, image processing circuitry 210, scanning circuitry 214, or the like, for determining an open state access condition for the access location 107 based upon the absence of scannable indicia 109. By way of continued example, the first imaging device 102 may continuously generate first image data of an access location 107 at operation 405. The computing device 200, via the scanning circuitry 214, may identify this absence of scannable indicia 109 in the first image data and, at operation 415, determine that the absence of such scannable indicia 109 is indicative of an open state access condition for the access location 107. As described above, the present disclosure contemplates that scannable indicia 109 of any type may be positioned at any location relative the access location 107 based upon the intended application of the system 100.

In any embodiment, the scannable indicia 109 (e.g., barcode or the like) may be received by the computing device 200 and analyzed to determine the PPE associated with a particular access location 107. Said differently, the scannable indicia 109 captured by the first imaging device 102 may be decoded so as to determine one or more items of PPE required in order for a user to access the particular access location 107. By way of example, the access location 107 may be associated with a healthcare facility such that the first image data that includes the scannable indicia 109, when analyzed by the scanning circuitry 214 of the computing device 200, may indicate that a user attempting entry to the healthcare facility is required to properly wear a mask or other face covering. In other embodiments, the scannable indicia 109, when analyzed by the scanning circuitry 214 of the computing device, may list an identifier (e.g., PPE code or the like). In such an embodiment, the computing device may compare such an identifier with one or more repositories or databases that contain PPE requirements associated with respective identifiers. In this way, the scannable indicia 109 associated with a particular access point may remain constant, but the PPE requirement associated with the access point may be dynamically updated.

FIG. 5 illustrates a flowchart containing a series of operations for safety parameter generation. The operations illustrated in FIG. 5 may, for example, be performed by, with the assistance of, and/or under the control of an apparatus (e.g., computing device 200), as described above. In this regard, performance of the operations may invoke one or more of processor 202, memory 204, input/output circuitry 206, communications circuitry 208, image processing circuitry 210, machine learning circuitry 212, and/or scanning circuitry 214.

As shown in operation 505, the apparatus (e.g., computing device 200) includes means, such as processor 202, communications circuitry 208, image processing circuitry 210, or the like, for receiving second image data of the field of view of the second imaging device 105 that includes the first user 101. As described above with reference to operation 315, the second imaging device 105 may be configured to capture the FOV 106 of the second imaging device 105 as second image data that is a 2D or 3D representation of this FOV 106. By way of example, the second imaging device 105 may be positioned and/or oriented so as to capture users attempting to access an access location 107. The second image data generated may further include image data (e.g., a captured image) of a safety device (e.g., mask) positioned relative to the first user 101. Said differently, the second image data may include numerical values associated with the coordinates of the vertices of polygons associated with the mask (e.g., PPE). Although described hereinafter with reference to an example mask detection implementation, the present disclosure contemplates that the safety parameter generated by FIG. 5 may account for any safety device or PPE based upon the intended application of the system 100.

In some embodiments, as shown in operation 510, the apparatus (e.g., computing device 200) includes means, such as processor 202, image processing circuitry 210, machine learning circuitry 212, or the like, for querying a calibrated image database to retrieve calibrated image data for the first user 101. As defined above, the calibrated image database 110 may refer to a storage or repository of image data generated one or more of the first imaging device 102 or the second imaging device 105. By way of example, the calibrated image database 110 may be configured to receive and store, as part of an initial calibration or training procedure, image data associated with a plurality of users. In some embodiments, the calibrated image database 110 may be stored locally (e.g., by memory 204 of the computing device 200) such that the query at operation 410 refers to an internal communication. In other embodiments, the calibrated image database 110 may be stored remotely from the computing device 200 such that the query at operation 510 refers to an external communication, via the network 104 or otherwise.

Thereafter, as shown in operation 515, the apparatus (e.g., computing device 200) includes means, such as processor 202, image processing circuitry 210, machine learning circuitry 212, or the like, for comparing the second image data that includes the first user 101 with calibrated image data associated with the first user 101. In such an embodiment, the second imaging device 105, as part of an initial registration procedure or otherwise, may capture images (e.g., generate second image data) of the first user 101 in which the first user 101 properly wears an associated safety device or PPE. This collection of captured images may be collectively analyzed by the computing device 200, via the image processing circuitry 210 and/or the machine learning circuitry 212, to generate calibrated image data for the first user 101 for a particular safety device or PPE. The calibrated image data for the first user 101 may serve as a benchmark against which second image data generated by the second imaging device 105 that includes the first user 101 may be compared.

In such an embodiment, as shown in operation 520, the apparatus (e.g., computing device 200) includes means, such as processor 202, image processing circuitry 210, machine learning circuitry 212, or the like, for generating the safety parameter based upon the comparison between the second image data and the calibrated image data. By way of example, the computing device 200 may compare the numerical values contained within the second image data indicative of the coordinates and properties of the vertices forming polygons within the FOV 106 of the second imaging device 105 including the first user 101 with the numerical values contained within the calibrated image data for the first user 101. Such a comparison may generate a safety parameter that is a score or numerical representation of the similarity between the second image data and the calibrated image data for the first user 101. By way of a particular example, the computing device 200 may determine that the second image data is 60% similar to the calibrated imaged data (e.g., 60% of the pixels, coordinates, or the like are substantially the same as the calibrated image data) such that the safety parameter of 0.6 or 60%.

In other embodiments, as shown in operation 525, the apparatus (e.g., computing device 200) includes means, such as processor 202, image processing circuitry 210, machine learning circuitry 212, or the like, for supplying the second image data to a machine learning model (e.g., artificial neural network, convolutional neural network, or other machine learning system) in order to analyze the second image data to identify the presence and relative positioning of the safety device (e.g., mask) and output an associated confidence value (e.g., safety parameter). As described above, in some embodiments, the second image data may be supplied to a machine learning model that may, for example, be trained upon image data generated by the second imaging device 105 for a plurality of users. For example, an artificial neural network used by the safety system 100 may be iteratively trained upon second image data that includes a plurality of users and associated safety devices at varying positions relative to the respective users. Said differently, such an artificial or convolutional neural network may be trained upon sufficient second image data so as to ascertain the position of the first user's mouth and the presence and position of the safety device or PPE (e.g., mask) relative to the first user's mouth.

During training of such an example machine learning model (e.g., artificial/convolutional neural network or the like), the model may be iteratively supplied with a plurality of second image data such that the model may be configured to, over time, determine patterns amongst the plurality of numerical values contained within coordinates defined by the second image data. Said differently, the machine learning model may be configured to determine a correlation or pattern associated with the numerical values at particular locations within the second image data so as to determine associated locations of the user captured by the second image data. For example, the machine learning model may be supplied with image data associated with a plurality of users with or without PPE and may further be supplied with image data associated with a plurality of users each with various forms of PPE. In some instances, this training may be supervised in which the machine learning model determines a particular type and fit of PPE and requests confirmation by a user (e.g., system administrator or the like). Alternatively or additionally, the machine learning model may be trained based on a corpus of data including user with and without PPE. In other embodiments, the machine learning model may be subjected to unsupervised training, reinforcement learning, semi-supervised training, and/or the like in order to analyze second image data.

In such an embodiment, as shown in operation 530, the apparatus (e.g., computing device 200) includes means, such as processor 202, image processing circuitry 210, machine learning circuitry 212, or the like, for generating the safety parameter based upon the output of the machine learning model. By way of a particular example, the safety parameter may, in some embodiments, refer to a confidence of the computing device 200 (e.g., a confidence of the artificial neural network or convolutional neural network) that a safety device or PPE is properly positioned. For example, the system may be 60% confident that the first user's mask is properly positioned relative a user's mouth resulting in a safety parameter of 0.6 or 60%.

In some embodiments, the training of the machine learning model may be such that the model is not only capable of determining a fit for a designated PPE (e.g., determining if a mask is properly worn), but may also be trained to analyze second image data and determine the type of PPE, if any, worn by the first user 101. In this way, the computing device 200 may compare the determined type of PPE with one or more repositories or databases storing PPE requirements with respective access locations as described above. Due to supplying the machine learning model with image data indicative of a plurality of users and a plurality of PPE types, in some embodiments, the machine learning model may be further configured to receive second image data that includes a plurality of users and, based upon the determined PPE worn by one or more users, determine the type of PPE associated with a particular access location 107. By way of example, the computing device 200 may be configured to receive second image data that includes a plurality of users and, based upon the training of one or more machine learning models leveraged by the computing device 200, the computing device 200 may determine that one or more users of the second image data are wearing a mask. In response, the computing device 200 may determine that the access location 107 proximate the second imaging device 105 may require that a user wear a mask before entry. Such a determination may be further confirmed by a system administrator or compared with a repository or database housing PPE requirements as described above.

FIGS. 3-5 thus illustrate flowcharts describing the operation of apparatuses, methods, and computer program products according to example embodiments contemplated herein. It will be understood that each flowchart block, and combinations of flowchart blocks, may be implemented by various means, such as hardware, firmware, processor, circuitry, and/or other devices associated with execution of software including one or more computer program instructions. For example, one or more of the operations described above may be implemented by an apparatus executing computer program instructions. In this regard, the computer program instructions may be stored by a memory 204 of the computing device 200 and executed by a processor 202 of the computing device 200. As will be appreciated, any such computer program instructions may be loaded onto a computer or other programmable apparatus (e.g., hardware) to produce a machine, such that the resulting computer or other programmable apparatus implements the functions specified in the flowchart blocks. These computer program instructions may also be stored in a computer-readable memory that may direct a computer or other programmable apparatus to function in a particular manner, such that the instructions stored in the computer-readable memory produce an article of manufacture, the execution of which implements the functions specified in the flowchart blocks. The computer program instructions may also be loaded onto a computer or other programmable apparatus to cause a series of operations to be performed on the computer or other programmable apparatus to produce a computer-implemented process such that the instructions executed on the computer or other programmable apparatus provide operations for implementing the functions specified in the flowchart blocks.

The flowchart blocks support combinations of means for performing the specified functions and combinations of operations for performing the specified functions. It will be understood that one or more blocks of the flowcharts, and combinations of blocks in the flowcharts, can be implemented by special purpose hardware-based computer systems which perform the specified functions, or combinations of special purpose hardware with computer instructions.

What is claimed is:

1. A method for access-related safety determinations, the method comprising:
receiving first image data of a field of view of a first imaging device that includes an access location;
determining an access condition of the access location based upon the first image data, wherein the access condition is indicative of an attempt to access the access location by a first user;
receiving second image data of a field of view of a second imaging device that includes the first user upon which to perform a safety determination;
generating a safety parameter associated with the first user within the field of view of the second imaging device, wherein the safety parameter is indicative of a presence and a positioning of a safety device of the first user;
comparing the safety parameter with a validation threshold;
determining that the safety parameter fails to satisfy the validation threshold; and
preventing access for the first user to the access location in response to determining that the safety parameter fails to satisfy the validation threshold.

2. The method according to claim 1, further comprising generating an alert signal in response to determining that the safety parameter fails to satisfy the validation threshold, wherein generating the alert signal further comprises generating a notification for display that comprises the safety parameter.

3. The method according to claim 1, further comprising generating an alert signal in response to determining that the safety parameter fails to satisfy the validation threshold, wherein generating the alert signal further comprises altering the access condition of the access location.

4. The method according to claim 1, wherein determining the access condition of the access location further comprises:
identifying an instance of scannable indicia in the first image data; and
determining an open state access condition for the access location based upon the scannable indicia.

5. The method according to claim 1, wherein determining the access condition of the access location further comprises:
identifying an absence of scannable indicia in the first image data; and
determining an open state access condition for the access location based upon the absence of scannable indicia.

6. The method according to claim 1, wherein generating the safety parameter further comprises comparing the second image data that includes the first user with calibrated image data associated with the first user.

7. The method according to claim 1, wherein generating the safety parameter further comprises supplying the second image data to a machine learning model.

8. The method of claim 1, wherein the field of view of the first imaging device and the field of view of the second imaging device partially overlap.

9. The method of claim 1, wherein the field of view of the first imaging device and the field of view of the second imaging device do not overlap.

10. A system for access-related safety determinations, the system comprising:
- a first imaging device configured to generate first image data of a field of view of the first imaging device that includes an access location;
- a second imaging device configured to generate second image data of a field of view of the second imaging device that includes a first user upon which to perform a safety determination; and
- a computing device operably connected with the first imaging device and the second imaging device, wherein the computing device is configured to:
  - receive the first image data;
  - determine an access condition of the access location based upon the first image data;
  - in an instance in which the access condition is indicative of an attempt to access the access location by the first user, receive the second image data;
  - generate a safety parameter associated with the first user within the field of view of the second imaging device, wherein the safety parameter is indicative of a presence and a positioning of a safety device of the first user;
  - compare the safety parameter with a validation threshold; and
  - prevent access for the first user to the access location in an instance in which the safety parameter fails to satisfy the validation threshold.

11. The system according to claim 10, wherein the computing device is further configured to generate a notification for display that comprises the safety parameter in an instance in which the safety parameter fails to satisfy the validation threshold.

12. The system according to claim 10, wherein the computing device is further configured to alter the access condition of the access location.

13. The system according to claim 10, wherein the computing device is configured to determine the access condition of the access location by:
- identifying an instance of scannable indicia in the first image data; and
- determining an open state access condition for the access location based upon the scannable indicia.

14. The system according to claim 10, wherein the computing device is configured to determine the access condition of the access location by:
- identifying an absence of scannable indicia in the first image data; and
- determining an open state access condition for the access location based upon the absence of scannable indicia.

15. The system according to claim 10, wherein the computing device is configured to generate the safety parameter by comparing the second image data that includes the first user with calibrated image data associated with the first user.

16. The system according to claim 10, wherein the computing device is configured to generate the safety parameter by supplying the second image data to a machine learning model.

17. A non-transitory computer-readable storage medium for using an apparatus for access-related safety determinations, the non-transitory computer-readable storage medium storing instructions that, when executed, cause the apparatus to:
- receive first image data of a field of view of a first imaging device that includes an access location;
- determine an access condition of the access location based upon the first image data;
- in an instance in which the access condition is indicative of an attempt to access the access location by a first user, receive second image data of a field of view of a second imaging device that includes the first user upon which to perform a safety determination;
- generate a safety parameter associated with the first user within the field of view of the second imaging device, wherein the safety parameter is indicative of a presence and a positioning of a safety device of the first user;
- compare the safety parameter with a validation threshold; and
- prevent access for the first user to the access location in an instance in which the safety parameter fails to satisfy the validation threshold.

18. The non-transitory computer-readable storage medium according to claim 17, wherein the non-transitory computer-readable storage medium stores instructions that, when executed, cause the apparatus to:
- identify an instance of scannable indicia in the first image data; and
- determine an open state access condition for the access location based upon the scannable indicia.

19. The non-transitory computer-readable storage medium according to claim 17, wherein the non-transitory computer-readable storage medium stores instructions that, when executed, cause the apparatus to:
- identify an absence of scannable indicia in the first image data; and
- determine an open state access condition for the access location based upon the absence of scannable indicia.

20. The non-transitory computer-readable storage medium according to claim 17, wherein the non-transitory computer-readable storage medium stores instructions that, when executed, cause the apparatus to:
- compare the second image data that includes the first user with calibrated image data associated with the first use; or
- supply the second image data to a machine learning model.

* * * * *